UNITED STATES PATENT OFFICE.

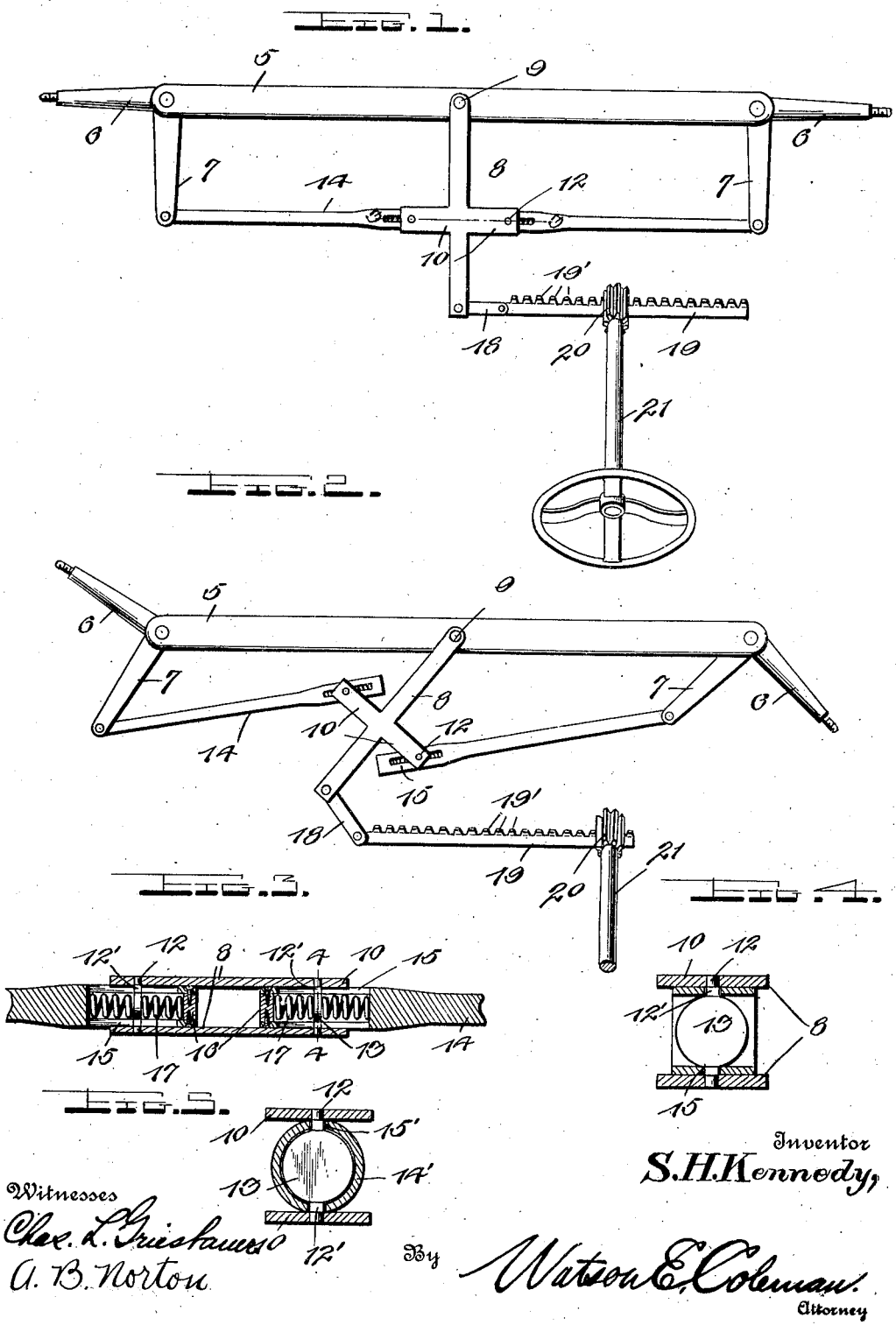

SAMUEL H. KENNEDY, OF TUNNEL HILL, GEORGIA.

VEHICLE STEERING MECHANISM.

1,058,758. Specification of Letters Patent. Patented Apr. 15, 1913.

Application filed April 5, 1912. Serial No. 688,749.

*To all whom it may concern:*

Be it known that I, SAMUEL H. KENNEDY, a citizen of the United States, residing at Tunnel Hill, in the county of Whitfield and State of Georgia, have invented certain new and useful Improvements in Vehicle Steering Mechanism, of which the following is a specification, reference being had to the accompanying drawings.

This invention relates to vehicle steering mechanism and has for its primary object to simplify and improve the construction of mechanism of that general character shown and described in my prior application for patent filed January 6th, 1912, Serial Number 669,771.

The present invention has for a more specific object to provide an extremely simple actuating means between the wheel carrying spindles whereby the same are positively and simultaneously actuated to obtain a differential turning movement of the steering wheels, whereby the cost of manufacture of motor vehicles and similar machines provided with my improved differential steering mechanism will be reduced to a minimum.

With the above and other objects in view, the invention consists of the novel features of construction, combination and arrangement of parts hereinafter fully described and claimed, and illustrated in the accompanying drawings, in which—

Figure 1 is a top plan view of my improved steering mechanism showing the same mounted upon a vehicle axle; Fig. 2 is a similar view showing the relative positions of the parts of the mechanism when making a right hand turn; Fig. 3 is an enlarged section taken on the line 3—3 of Fig. 1; Fig. 4 is a section taken on the line 4—4 of Fig. 3; and Fig. 5 is a section similar to Fig. 4 illustrating a slightly modified form of the device.

Referring in detail to the drawing 5 designates the vehicle axle upon the ends of which the wheel spindles or knuckles 6 are pivotally mounted for movement in a horizontal plane. To the inner pivoted ends of these wheel knuckles the rearwardly extending arms 7 are secured or integrally formed therewith.

Spaced actuating members 8 are mounted upon the central portion of the axle 5 and extend rearwardly thereof. The forward ends of these members extend above and below the axle respectively and are fulcrumed thereon as shown at 9. Each of these members is of cruciform shape in plan, the intermediate laterally extending arms 10 thereof being provided with openings to receive the cylindrical portions of the studs or pins 12 which are integrally formed at diametrically opposite points upon the periphery of a disk 13. The connecting bars 14 are pivotally connected to the rear ends of the steering arms 7 and have their inner ends disposed between the spaced arms 10 of the actuating members 8. The inner ends of these connecting bars are of increased thickness and of substantially rectangular form in cross section and are bifurcated, the parallel arms being provided with the longitudinal slots 15. Through these slots the rectangular or squared portions 12' of the studs or pins 12 carried by the disks 13, extend. The extremities of the parallel portions of the connecting bars 14 are secured together and rigidly connected by means of blocks 16. Coiled springs 17 are arranged upon opposite sides of the disks 18 and between the spaced arms of the connecting bars, said springs bearing against the disks to hold the connecting bars 14 against casual or unintentional movement.

Between the rear ends of the actuating members 8 one end of a laterally projecting link 18 is rigidly fixed. To the other end of this link one end of a transversely movable rack bar 19 is pivotally connected. The teeth 19' of this bar are engaged by the teeth of a pinion 20 secured upon the lower end of a steering shaft 21. The rack bar 19 is mounted for sliding movement in suitable guides arranged upon the frame of the vehicle.

In the operation of the device, assuming that the parts are in the position shown in Fig. 1 and it is desired to make a turn to the right, the operator turns the wheel on the upper end of the steering shaft 21 to rotate the pinion 20 and thereby move the rack bar 19 to the left. This movement of the rack bar swings the actuating members 8 to the left, and throws the inner ends of the connecting bars 14 upwardly and downwardly respectively. It will be obvious that when the point of connection of the left arm 14 to the members 8 is disposed in advance of the point of connection of the outer end of said member to the steering arm 7, the turning movement of the knuckle or spindle 6 on the left will decrease while there will be a relatively increased turning movement of the right hand wheel in the continued pivotal movement of the actuating members 8. In this manner, a differential movement of the wheels is obtained and the right hand or inner steering wheel is turned to a greater extent than the outer or left hand wheel whereby the proper turning movement of the vehicle is obtained. The springs 17 constitute the yieldable connection between the inner ends of the members 14 and the actuating members 8 are of such strength that they will not interfere with the movement of the connections 14 when the members 8 are positively actuated through the medium of the rack bar 19. When, however, the wheels of the vehicle strike an obstruction, the movement of the steering knuckles is taken up or absorbed by said springs and is not transmitted to the rack bar 19 through the members 8, which would strip the teeth from the rack bar or turn the steering shaft. By the employment of these springs, the steering knuckles are also relieved of undue strain which would be caused by the sudden impact of the wheels with obstructions. These springs further act in the nature of a shock absorber and materially reduce vibration of the vehicle body.

In Fig. 5 I have shown a slightly modified form of the connection between the connecting bars 14 and the actuating members 8 wherein the inner ends of said connecting bars are provided with the cylindrical casings 14' in which the disks 13 between the arms 10 are disposed. This casing is longitudinally slotted at diametrically opposite points as indicated at 15' for movement upon the pivot studs of the disks. By providing these casings it will be readily seen that the springs which are mounted between the opposite ends of the casings and the faces of the disks 13, are entirely housed and protected from accumulations of mud or other foreign matter which would interfere with their proper action.

From the foregoing it is believed that the construction and manner of operation of my improved steering mechanism will be clearly understood. It will be observed that the device is much simpler than that shown in my prior application hereinbefore referred to. It is consequently apparent that the device as a whole may be inexpensively manufactured, will be positive and efficient in its action and is extremely durable in practical use.

While I have shown and described the preferred construction and arrangement of the various elements, it will be obvious that the invention is susceptible of considerable modification without departing from the essential feature or sacrificing any of the advantages thereof.

Having thus described the invention what is claimed is:—

1. In a steering mechanism for vehicles, an actuating member fulcrumed at one end centrally upon the vehicle axle for movement in a horizontal plane, said member having oppositely extending arms, bars connected at their outer ends to the wheel spindles, guide members mounted in the arms of the actuating member, the inner ends of said bars being longitudinally movable upon said guide members, and coil springs mounted in the ends of said bars and bearing against the guide members to yieldingly hold said bars against movement independently of the actuating member.

2. In a steering mechanism for vehicles, an actuating member fulcrumed upon the vehicle axle, guide members pivotally mounted in said actuating member, bars connected at their ends to the wheel spindles, the inner ends of said bars being provided with longitudinal slots to receive the pivoted guide members, and coil springs arranged in said slots upon opposite sides of the guide members to yieldingly prevent movement of said bars independently of the actuating member.

3. In a steering mechanism for vehicles, spaced actuating members having their forward ends disposed above and below the vehicle axle and pivotally mounted thereon for movement in a horizontal plane, said members being provided with oppositely disposed laterally extending arms, disks connecting the arms of the respective members and pivotally mounted therein, bars connected at their outer ends to the wheel spindles and movable upon said disks at their inner ends, springs mounted in said bars and bearing against the disks to normally prevent movement of the bars independently of the actuating members, a rack bar connected at one end to the rear ends of said actuating members, and a steering shaft provided with a pinion meshing with the teeth of said rack bar to shift the same and positively turn the vehicle wheels.

4. In a steering mechanism for vehicles, spaced actuating members pivotally mounted at their forward ends upon the vehicle axle for movement in a horizontal plane, said members each being provided with oppositely extending laterally disposed arms, disks pivotally mounted in the ends of the opposed arms of said actuating members, bars pivotally connected at their outer ends to the wheel spindles, the inner ends of said bars being bifurcated to receive said disks and slotted to receive the pivot studs of said disks, coiled springs mounted in the bifurcated ends of said connecting bars and bearing against the faces of the disks, said springs normally acting to prevent movement of the connecting bars with respect to the actuating members but permitting of such independent movement upon unintentional turning movement of the vehicle wheels, a transversely movable rack bar connected at one of its ends to the rear ends of the actuating members, and a steering shaft provided with a pinion upon its lower end meshing with the teeth of the rack bar to shift the same and move the actuating members to effect a differential turning movement of the vehicle wheels.

In testimony whereof, I hereunto affix my signature in the presence of two witnesses.

SAMUEL H. KENNEDY.

Witnesses:
 A. S. BANDY,
 L. J. FLEMISTER.